(12) United States Patent
Fujise

(10) Patent No.: US 6,829,843 B2
(45) Date of Patent: Dec. 14, 2004

(54) PROCESS FOR PREPARING VINYLPYRROLIDONE POLYMER POWDER

(75) Inventor: Keiichi Fujise, Kusatsu (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 10/754,862

(22) Filed: Jan. 8, 2004

(65) Prior Publication Data

US 2004/0139625 A1 Jul. 22, 2004

(30) Foreign Application Priority Data

Jan. 8, 2003 (JP) ........................................ 2003-002633

(51) Int. Cl.[7] ................................................. F26B 3/12
(52) U.S. Cl. .............................. 34/282; 34/314; 34/315; 34/372
(58) Field of Search ......................... 34/282, 312, 313, 34/314, 315, 316, 372, 58, 59; 528/501

(56) References Cited

U.S. PATENT DOCUMENTS 5,426,163 A 6/1995 Buehler et al.
5,674,436 A 10/1997 Breitenbach et al.
6,346,600 B1 * 2/2002 Tomihisa et al. ........... 528/501
6,498,231 B2 * 12/2002 Tomihisa et al. ........... 528/501

FOREIGN PATENT DOCUMENTS

| EP | 0545209 | 6/1993 |
| EP | 0714919 | 6/1996 |
| JP | H08-208741 | 8/1996 |

* cited by examiner

Primary Examiner—Jiping Lu
(74) Attorney, Agent, or Firm—Ware, Fressola, Van Der Sluys & Adolphson LLP

(57) ABSTRACT

The present invention provides a process for preparing vinylpyrrolidone polymer powder, which has high bulk density and favorable powder flowability and can be handled with ease. Specifically, the present invention relates to a process for preparing vinylpyrrolidone polymer powder, which comprises spraying an aqueous solution of a vinylpyrrolidone polymer into a drying tower using a disc atomizer and then drying.

10 Claims, 1 Drawing Sheet

PROCESS FOR PREPARING VINYLPYRROLIDONE POLYMER POWDER

CROSS-REFERENCE TO RELATED APPLICATION

The present application claims priority from Japanese Application No. 2003-002633, filed on Jan. 8, 2003.

BACKGROUND OF THE INVENTION

The present invention relates to a process for preparing vinylpyrrolidone polymer powder, which has high bulk density and favorable powder flowability and can be handled with ease.

Conventionally, when drying an aqueous solution of a vinylpyrrolidone polymer, a spray dryer (see JP-A-8-208741) or a drum dryer has been used. However, the vinyl pyrolidone polymer powder obtained by using these methods under the conditions of the prior art has low bulk density and poor powder flowability. Therefore, conventional vinylpyrrolidone polymer powder is difficult to handle. Also, because the weight per unit volume is small, there is the problem that costs for exporting become high, regardless of transportation by air or sea. Particularly, the above problem is noticeable in the case of a vinylpyrrolidone polymer with a low K value.

SUMMARY OF THE INVENTION

The present invention aims to provide a process for preparing vinylpyrrolidone polymer powder, which has high bulk density and favorable powder flowability and can be handled with ease.

The present invention relates to a process for preparing vinylpyrrolidone polymer powder, which comprises spraying an aqueous solution of a vinylpyrrolidone polymer into a drying tower using a disc atomizer and then drying; wherein the peripheral speed of the disc of the disc atomizer is at least 4,500 m/minute, the temperature of hot air introduced into the drying tower (temperature of heat entering tower) is 165° to 300° C. and the temperature discharged from the drying tower (temperature of heat escaping tower) is 100° to 140° C.

The aqueous solution of a vinylpyrrolidone polymer is preferably sprayed from a disc atomizer installed on the upper part of the drying tower into the drying tower and dried while falling.

A drying tower with a height of at least 9 m and a diameter of at least 5 m is preferably used.

The speed of water evaporation (L/minute)/peripheral speed of disc (m/minute) in the drying tower is preferably 0.0001 to 0.009 (L/m).

The K value (value representing molecular weight according to the Fikentscher method) of the vinylpyrrolidone polymer is preferably 10 to 60.

The bulk density of the vinylpyrrolidone polymer powder is preferably at least 0.50.

According to the present invention, vinylpyrrolidone polymer powder, which has high bulk density and favorable powder flowability and can be handled with ease, can be prepared.

DETAILED DESCRIPTION

Figure 1:
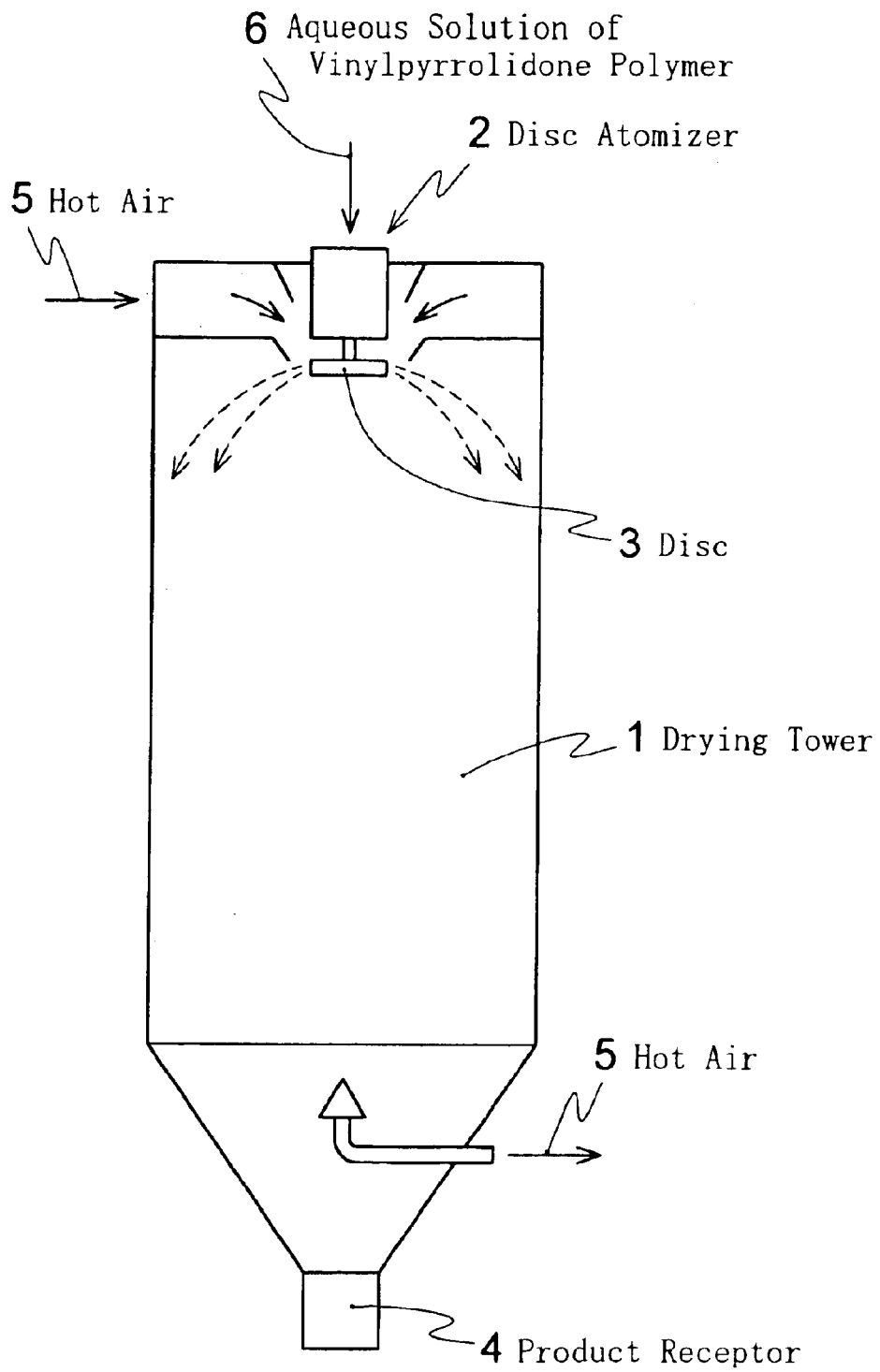
FIG. 1 is a brief diagram of an example of the device used in the present invention.

In the present invention, vinylpyrrolidone polymer powder is prepared by spraying an aqueous solution of a vinylpyrrolidone polymer into a drying tower using a disc atomizer and then drying.

Herein, vinylpyrrolidone refers to the usual N-vinyl-2-pyrrolidone. Vinylpyrrolidone polymer includes a homopolymer of vinylpyrrolidone and a copolymer of vinylpyrrolidone and another monomer (copolymer preferably containing at least 20% by weight (hereinafter referred to as %), more preferably at least 30%, of vinylpyrrolidone units).

Examples of the other monomer are acrylic acid, methacrylic acid, alkylester of acrylic acid (for example methyl acrylate and ethyl acrylate), alkylester of methacrylic acid (for example methyl methacrylate and ethyl methacrylate), aminoalkylester of acrylic acid (for example diethylaminoethyl acrylate), aminoalkylester of methacrylic acid, monoester of acrylic acid and glycol, monoester of methacrylic acid and glycol (for example hydroxyethyl methacrylate), alkali metal salt of acrylic acid, alkali metal salt of methacrylic acid, ammonium salt of acrylic acid, ammonium salt of methacrylic acid, quaternary ammonium derivative of aminoalkylester of acrylic acid, quaternary ammonium derivative of aminoalkylester of methacrylic acid, quaternary ammonium compound of diethylaminoethyl acrylate and methylsulfate, vinyl methyl ether, vinyl ethyl ether, alkali metal salt of vinyl sulfonic acid, ammonium salt of vinyl sulfonic acid, styrene sulfonic acid, styrene sulfonate, allylsulfonic acid, allylsulfonate, methallylsulfonic acid, methallylsulfonate, vinyl acetate, vinyl stearate, N-vinylimidazole, N-vinylacetamide, N-vinylformamide, N-vinylcaprolactam, N-vinylcarbazole, acrylamide, methacrylamide, N-alkylacrylamide, N-methylolacrylamide, N,N-methylene bisacrylamide, glycol diacrylate, glycol dimethacrylate, divinylbenzene and glycol diallyl ether.

The K value of the vinylpyrrolidone polymer used in the present invention is for example 10 to 60, preferably 15 to 40. When the K value is less than 10, the glass transition temperature becomes low and as a result, the dried vinylpyrrolidone polymer adhere to each other and obtaining favorable powder flowability tends to become difficult. When the K value is more than 60, the aqueous solution of a vinylpyrrolidone polymer exhibits stringiness and as a result, dried vinylpyrrolidone polymer with a spherical shape is difficult to obtain, powder flowability is poor and bulk density tends to become low.

The K value is a value representing molecular weight according to the Fikentscher method and can be found from the following measurement method. When the K value is less than 20, the viscosity of a 5% (g/100 ml) solution is measured and when the K value is 20 or higher, the viscosity of a 1% (g/100 ml) solution is measured. The concentration of the solution refers to the concentration of the sample, that is the dried vinylpyrrolidone polymer, within the solution. When the K value is 20 or higher, 1.0 g of the sample is accurately measured and added to a 100 ml measuring flask. Distilled water is added at room temperature and the sample is completely dissolved by shaking. Then, distilled water is added thereto to become exactly 100 ml in total. This sample solution is left for 30 minutes in a constant bath (25±0.2° C.) and then measured using an Ubbelohde viscometer. The time required for the sample solution to flow between two marked lines is measured and after measuring several times, the average value is found. In order to define the relative viscosity, the distilled water was also measured in the same way. The flowing time, which was found regarding the sample solution and the distilled water, are corrected based on the correction value of Hagenbach-Couette.

$$K \text{ value} = \frac{\sqrt{300C\log Z + (C + 1.5C\log Z)^2} + 1.5C\log Z - C}{0.15C + 0.003C^2}$$

In the above equation, Z represents the relative viscosity (ηrel) of a solution with concentration C and C represents the concentration of the sample (%: g/100 ml).

The relative viscosity ηrel is obtained by the following equation.

$\eta rel$=(Flowing time of solution)÷(Flowing time of water)

The concentration of the aqueous solution of a vinylpyrrolidone polymer is preferably 5 to 60%, more preferably 10 to 40%. When the concentration is less than 5%, production costs tend to become high, because the amount of water to be dried is large in relation to the amount of the obtained dried substance. When the concentration is more than 60%, viscosity becomes high, dried vinylpyrrolidone polymers with a spherical shape are difficult to obtain and powder flowability tends to be poor.

As the aqueous solution of a vinylpyrrolidone polymer, for example, a 40% aqueous solution of a vinylpyrrolidone polymer with a K value of 17, a 30% aqueous solution of a vinylpyrrolidone polymer with a K value of 30 and a 30% aqueous solution of a vinylpyrrolidone polymer with a K value of 40 can be used. Furthermore, an aqueous solution containing alcohol such as methanol and ethanol and various organic solvents can be used, as long as the vinylpyrrolidone polymer does not deposit or precipitate.

The aqueous solution of a vinylpyrrolidone polymer is sent for example from the raw solution tank to inside the disc atomizer by a pump. The speed of pumping the aqueous solution of a vinylpyrrolidone polymer is 50 to 2,000 L, preferably 100 to 1,000 L, per hour.

The disc of the disc atomizer can be for example a vane type (VN type or VS type), a kesner type (K type) and a pin type (M type). The diameter of the disc is usually 5 to 35 cm, preferably 13 to 30 cm. The rotational speed of the disc is usually 4,000 to 65,000 rpm, more preferably 5,000 to 25,000 rpm. The rotational speed of the disc is adjusted by the diameter of the disc, so that the peripheral speed of the disc becomes at least 4,500 m/minute, preferably at least 4,500 to 10,000 m/minute. When the peripheral speed of the disc is less than 4,500 m/minute, dried vinylpyrrolidone polymer having a spherical shape is difficult to obtain, powder flowability becomes poor and bulk density becomes low.

In the present invention, the aqueous solution of a vinylpyrrolidone polymer is sprayed from the upper part of the drying tower, in which hot air is circulated, to the inside of the drying tower by a disc atomizer, dried while falling and thereafter, recovered as vinylpyrrolidone polymer powder in the product receptor at the lower part of the drying tower. FIG. 1 is a brief diagram of an example of the device used in the present invention. In FIG. 1, 1 represents the drying tower, disc atomizer 2 is located on the upper part of drying tower 1 and product receptor 4 is located on the lower part. Disc atomizer 2 has disc 3 as a constituting component. Hot air 5 is introduced from the upper part of drying tower 1 and discharged from the lower part. Aqueous solution of vinylpyrrolidone polymer 6 is introduced into disc atomizer 2 and sprayed to the inside of the drying tower by disc 3 of disc atomizer 2. The sprayed aqueous solution of a vinylpyrrolidone polymer is dried while falling and recovered in product receptor 4.

The drying tower has a disc atomizer on the upper part and a height of at least 9 m, preferably 9 to 20 m. When the height is less than 9 m, drying is insufficient as the drying distance is short and powder with favorable flowability cannot be obtained. In the case that the sprayed amount is reduced in order to dry favorably, fine powder increases, causing electrostatic coagulation, and consequently bulk density tends to become small. The diameter of the drying tower is at least 5 m, preferably 6 to 10 m. When the diameter is less than 5 m, the drying is insufficient as the drying distance is short and powder with favorable flowability cannot be obtained. In the case that the sprayed amount is reduced in order to dry favorably, fine powder increases, causing electrostatic coagulation, and consequently bulk density tends to become small.

Hot air is circulated in the drying tower. Hot air can be circulated from the upper part of the drying tower towards the lower part of the drying tower. Examples of the device for generating hot air are an electric heater, a device utilizing combustion heat from flammable gas such as LP gas and a device utilizing combustion heat from flammable oil such as fuel oil. Of these, an electric heater or combustion heat from flammable gas is preferably used, as pollution by soot hardly occurs. As hot air, inert gas, which is commonly used as a heat medium, can be used. An example of easily available hot air is air. That is, nitrogen, oxygen, carbon dioxide and mixtures thereof can be used. The temperature of hot air when introduced into the drying tower (temperature of heat entering tower) is 165° to 300° C., preferably 170° to 230° C. When the temperature is lower than 165° C., the drying speed is slow and the dried particles have difficulty becoming spherical and as a result, flowability tends to become poor and bulk density tends to become low. When the temperature is higher than 300° C., the water content of the drops sprayed from the atomizer evaporate suddenly, causing a phenomenon similar to explosion of the spherical dried substances, and the flowability of the dried substance tends to become poor and bulk density tends to decrease. Also, the temperature of the hot air when discharged from the drying tower (temperature of heat escaping tower) is 100° to 140° C., preferably 105° to 120° C. When the temperature is lower than 100° C., drying is insufficient and the flowability of the dried substance tends to become poor. When the temperature is higher than 140° C., flowability tends to become poor due to adhesion of the dried particles and bulk density tends to decrease. Also, yellowing of the dried substance occurs.

In the present invention, the value of speed of water evaporation (L/minute)/peripheral speed of disc (m/minute) is 0.0001 to 0.009 (L/m), preferably 0.0003 to 0.002 (L/m). The speed of water evaporation (L/minute) is found from the following equation.

Speed of Water Evaporation (L/minute)=[amount of aqueous solution of vinylpyrrolidone polymer supplied into drying tower per minute (g)−amount of vinylpyrrolidone polymer powder prepared per minute (g)]÷density of water÷1000

When the value of speed of water evaporation (L/minute)/peripheral speed of disc (m/minute) is less than 0.0001 (L/m), the particle size of the prepared vinylpyrrolidone polymer powder becomes small and electrostatic coagulation of the particles tends to easily occur. When electrostatic coagulation occurs, the angle of repose of the vinylpyrrolidone polymer powder becomes large, powder flowability becomes poor and bulk density becomes low. Also, the particles tend to be easily broken and consequently, in the same way, the angle of repose becomes large and bulk density becomes low. When the above value is more than 0.009 (L/m), drying in insufficient and as a result, the vinylpyrrolidone polymer tends to adhere to the drying tower. Also, the particle size becomes large and bulk density becomes low. Furthermore, because the aqueous solution of a vinylpyrrolidone polymer is extremely stringy, spraying in a spherical shape is difficult.

The value of speed of water evaporation (L/minute)/peripheral speed of disc (m/minute) can be controlled by adjusting the peripheral speed of the disc and the speed of water evaporation. The amount of evaporated water can be adjusted for example by changing the speed of supplying the aqueous solution of a vinylpyrrolidone polymer, the temperature of heat entering the tower and the temperature of heat escaping the tower.

Part of the vinylpyrrolidone polymer powder obtained by drying in the drying tower is recovered in the product receptor at the lower part of the drying tower. The remaining vinylpyrrolidone polymer fine powder is discharged from the lower part of the drying tower together with the hot air and by being introduced into a cyclone, can be recovered in the product receptor at the lower part of the cyclone.

The bulk density of the vinylpyrrolidone polymer powder obtained in the present invention is at least 0.50, preferably 0.50 to 0.70. When the bulk density is less than 0.50, the bulk is large in proportion to the weight, which is small, and transportation costs tend to become high. The bulk density of the vinylpyrrolidone polymer powder can be adjusted by changing the peripheral speed of the disc, the temperature of heat entering the tower, the temperature of heat escaping the tower and supplied amount of the vinylpyrrolidone polymer (speed of water evaporation).

The angle of repose of the vinylpyrrolidone polymer powder obtained in the present invention, measured by a MIWA method cylinder rolling-type angle of repose measuring instrument within 10 minutes of contacting the vinylpyrrolidone polymer powder with air under conditions of room temperature (20° to 30° C.) and humidity of at most 60%, is preferably at most 40°, more preferably at most 30°. Vinylpyrrolidone polymer powder with an angle of repose of at most 40° has favorable powder flowability.

The vinylpyrrolidone polymer powder obtained in the present invention is applied as raw material for various adhesives, a dispersant for hair styling agents, shampoo or ink, a migration proofing agent or for medical uses. The vinylpyrrolidone polymer powder obtained in the present invention has favorable powder flowability and consequently has the industrial advantage of ease in handling when charging as raw material. Also, transportation costs can be reduced as the vinylpyrrolidone polymer powder can be transported with ease.

EXAMPLES 1 to 4 AND COMPARATIVE EXAMPLES 1 to 3

1 t of an aqueous solution of a vinylpyrrolidone polymer ("Pitzcol K-30L", available from Dai-ichi Kogyo Seiyaku Co., Ltd., K value: 30, concentration: 30%) was introduced into a disc atomizer (vane type (VN type)) and sprayed and dried under the conditions shown in Table 1. The bulk density and angle of repose of the obtained vinylpyrrolidone polymer powder were evaluated by the following method. The results are shown in Table 1.

<Bulk Density (After Tapping)>

20 g of the vinylpyrrolidone polymer powder was measured and added into a 100 mL graduated cylinder. Tapping was conducted until the volume no longer changed and volume A (ml) was found. The bulk density was found from the following equation.

$$\text{Bulk Density (after tapping)} = 20/A$$

<Angle of Repose>

The angle of repose was measured using 250 ml of the vinylpyrrolidone polymer powder, under conditions of 25° C. and humidity of 50%, by a MIWA method cylinder rotating-type angle of repose measuring instrument (made by Tsutsui Rikagaku Kikai Co., Ltd.) within 10 minutes of contacting the vinylpyrrolidone polymer powder with air.

TABLE 1

| | Ex. 1 | Ex. 2 | Ex. 3 | Ex. 4 | Com. Ex. 1 | Com. Ex. 2 | Com. Ex. 3 |
|---|---|---|---|---|---|---|---|
| Spraying Conditions | | | | | | | |
| Diameter of Disc (cm) | 15.5 | 27.0 | 27.0 | 27.0 | 10.0 | 10.0 | 10.0 |
| Peripheral Speed of Disc (m/minute) | 5100 | 5280 | 5400 | 5400 | 4000 | 5100 | 5100 |
| Drying Tower Conditions | | | | | | | |
| Height of Tower (m) | 9.7 | 11 | 17 | 17 | 8 | 8 | 8 |
| Diameter of Tower (m) | 5.6 | 6.0 | 9.0 | 9.0 | 4.5 | 4.5 | 4.5 |
| Temperature of Hot Air* Entering Tower | 170 | 220 | 280 | 280 | 160 | 170 | 320 |
| Temperature of Hot Air* Escaping Tower | 102 | 105 | 120 | 135 | 100 | 90 | 130 |
| Speed of Water Evaporation (L/minute) | 91.8 | 380 | 551 | 486 | 48.0 | 245 | 1530 |
| Speed of Supplying Aqueous Solution of Vinylpyrrolidone Polymer | 133 | 550 | 797 | 703 | 69.5 | 355 | 2214 |
| Speed of Water Evaporation/Peripheral Speed of Disc | 0.0003 | 0.0012 | 0.0017 | 0.0015 | 0.0002 | 0.0008 | 0.0050 |
| Evaluation Results | | | | | | | |
| Bulk Density (after tapping) | 0.51 | 0.54 | 0.58 | 0.58 | 0.40 | 0.46 | 0.30 |
| Angle of Repose | 55 | 35 | 30 | 40 | >60 | >60 | >60 |

*Hot air is composed of air

According to the present invention, vinylpyrrolidone polymer powder, which has high bulk density and favorable powder flowability and can be handled with ease, can be obtained. Furthermore, the obtained vinylpyrrolidone polymer powder can be easily transported and consequently transportation costs can be reduced.

What is claimed is:

1. A process for preparing vinylpyrrolidone polymer powder which comprises spraying an aqueous solution of a vinylpyrrolidone polymer into a drying tower using a disc atomizer and then drying;

wherein peripheral speed of disc of said disc atomizer is at least 4,500 m/minute, temperature of hot air introduced into said drying tower (temperature of heat entering tower) is 165° to 300° C. and temperature discharged from said drying tower (temperature of heat escaping tower) is 100° to 140° C.

2. The process for preparing vinylpyrrolidone polymer powder of claim 1, wherein said aqueous solution of a vinylpyrrolidone polymer is sprayed from a disc atomizer installed on the upper part of said drying tower into said drying tower and dried while falling.

3. The process for preparing vinylpyrrolidone polymer powder of claim 1, wherein a drying tower with a height of at least 9 m and a diameter of at least 5 m is used.

4. The process for preparing vinylpyrrolidone polymer powder of claim 1, wherein speed of water evaporation (L/minute)/peripheral speed of disc (m/minute) in said drying tower is 0.0001 to 0.009 (L/m).

5. The process for preparing vinylpyrrolidone polymer powder of claim 1, wherein K value (value representing molecular weight according to Fikentscher method) of said vinylpyrrolidone polymer is 10 to 60.

6. The process for preparing vinylpyrrolidone polymer powder of claim 1 or 2, wherein bulk density of said vinylpyrrolidone polymer powder is at least 0.50.

7. The process for preparing vinylpyrrolidone polymer powder of claim 2, wherein a drying tower with a height of at least 9 m and a diameter of at least 5 m is used.

8. The process for preparing vinylpyrrolidone polymer powder of claim 2, wherein speed of water evaporation (L/minute)/peripheral speed of disc (m/minute) in said drying tower is 0.0001 to 0.0009.

9. The process for preparing vinylpyrrolidone polymer powder of claim 2, wherein K value (value representing molecular weight according to Fikentscher method) of said vinylpyrrolidone polymer is 10 to 60.

10. The process for preparing vinylpyrrolidone polymer powder of claim 2, wherein bulk density of said vinylpyrrolidone polymer powder is at least 0.05.

* * * * *

UNITED STATES PATENT AND TRADEMARK OFFICE
CERTIFICATE OF CORRECTION

PATENT NO.   : 6,829,843 B2
DATED        : December 14, 2004
INVENTOR(S)  : K. Fujise It is certified that error appears in the above-identified patent and that said Letters Patent is hereby corrected as shown below:

Column 8,
Line 8, after "claim 1", please cancel "or 2";
Line 16, please cancel "0.0009" and substitute -- 0.009 (L/m) -- therefor; and
Line 25, please cancel "0.05" and substitute -- 0.50 -- therefor.

Signed and Sealed this

Twelfth Day of July, 2005

JON W. DUDAS
*Director of the United States Patent and Trademark Office*